(12) United States Patent
Huang

(10) Patent No.: US 7,306,449 B2
(45) Date of Patent: Dec. 11, 2007

(54) FOOD SHAPING DEVICE FOR FORMING THREE-LAYERED FOODS

(76) Inventor: Lien-Fu Huang, 235 Chung-Ho Box 8-24, Taipei Hsien (TW)

( * ) Notice: Subject to any disclaimer, the term of this patent is extended or adjusted under 35 U.S.C. 154(b) by 982 days.

(21) Appl. No.: 10/642,487

(22) Filed: Aug. 18, 2003

(65) Prior Publication Data

US 2005/0042348 A1    Feb. 24, 2005

(51) Int. Cl.
*A21C 3/04* (2006.01)
*A21C 5/08* (2006.01)

(52) U.S. Cl. .................. 425/308; 425/114; 425/133.1; 425/204; 425/205; 425/382.3; 425/462; 426/283; 426/284; 426/516

(58) Field of Classification Search ................ 425/114, 425/133.1, 204, 205, 209, 308, 377, 376.1, 425/382.3, 462; 426/283, 284, 516
See application file for complete search history.

(56) References Cited

U.S. PATENT DOCUMENTS 4,715,803 A * 12/1987 Koppa ..................... 425/133.1
4,748,031 A * 5/1988 Koppa ........................ 426/283
4,854,842 A * 8/1989 Kobayashi ............... 425/133.1
4,966,542 A * 10/1990 Kobayashi .................. 425/307
5,004,619 A * 4/1991 Kobayashi .................. 426/297
5,686,128 A * 11/1997 Tracy et al. ................. 426/284
5,820,890 A * 10/1998 Kobayashi ............... 425/133.1

* cited by examiner

*Primary Examiner*—Robert B. Davis
*Assistant Examiner*—Joseph Leyson
(74) *Attorney, Agent, or Firm*—Ming Chow Sinorica, LLC

(57) ABSTRACT

A food shaping device for forming a three-layered food comprises: at least two first guide units and a food output unit. The food output device comprises a main tube; a middle tube; an inner tube; an inner circular path; an inner material guiding nozzle; and an outer material guiding nozzle. Stuffing is filled into a second guide unit; then the stuffing is pushed to the output end of the inner tube by a screw propeller to be as an inner layer material. Dough is fed into the inlets of the main tube from the two first paths and then is further processed to be as an outer layer material of the food product. A part of the dough horizontally passes through the transversal inlet of the middle tube and is further processed to be as a middle layer material. Thus a three layers food is formed.

6 Claims, 15 Drawing Sheets

FOOD SHAPING DEVICE FOR FORMING THREE-LAYERED FOODS

FIELD OF THE INVENTION

The present invention relates to food shaping device, and particularly to a food shaping device for forming three-layered foods, such as a pie. The inner layer material of the three-layered food can be powdered stuffing or particle stuffing. The movements of the stuffing and dough in the shaping device are smooth and stable so that high flexible material can be used as the material of the three-layered food.

BACKGROUND OF THE INVENTION

In the prior art, a shaping, device for forming two layer food (one dough layer and one stuffing within the dough layer) has been developed by Japan KOBIRO CO., LTD. The prior art discloses a device for manufacturing a two layer shaping food, wherein a two layer food is formed with an inner layer of stuffing and an outer layer of dough. A surface of the outer layer is formed with a plurality of strips. A cylindrical food is cut into a plurality of ball shape foods. However this prior art only forms foods of two layers instead of three layers.

In 1998, Japan Rheon Automatic Machinery Co. Ltd discloses a device for manufacturing a two layer shaping food which forms a ball shape food with outer dough and inner stuffing. Moreover, in 1990, Rheon Automatic Machinery Co. Ltd discloses a device for feeding two layer foods and a method for forming the same. In this prior art, a dough (or stuffing) is moved horizontally to a turbine pump. Then the turbine pump rotates for changing the moving direction of the dough. However the product of this prior art is also a two layer food.

In 1999, Rheon Automatic Machinery Co. Ltd discloses a method for feeding food material and a device for forming the same. In this prior art, two horizontally screw rods are used to drive a dough in a receiving tank to move forward. Then the turbine pump is used to change the direction of the dough so that the dough is inputted into a shaping device so as to form a cylindrical food with an inner stuffing and outer dough.

Moreover, Rheon Automatic Machinery Co. Ltd further discloses a device for manufacturing two layer foods. In that, two horizontally arranged screw rods, a turbine pump for changing moving direction of a dough, and a nozzle are used for making a cylindrical two layer foods.

In above prior arts, all the devices and methods can only make two layer foods, but they cannot make three layer foods.

Moreover, in above prior arts, in driving the dough and changing the moving direction of the dough, no any guide device which is beneficial for guiding high flexible dough. Thus the friction force is high and the moving of the dough is not smooth. As a result, the quality of the food is not preferred.

Thereby, there is an eager demand for a novel design which can produce three layer food products and can make the dough to move smoothly

SUMMARY OF THE INVENTION

Accordingly, the primary object of the present invention is to provide a food shaping device for forming a three-layered food which form a food, such as a pie, and the food has three layers.

Another object of the present invention is to provide a food shaping device for forming a three-layered food, wherein the inner layer material of the three-layered food can be powdered stuffing or particle stuffing.

A further object of the present invention is to provide a food shaping device for forming a three-layered food, wherein the movements of the stuffing and dough in the shaping device are smooth and stable so that high flexible material can be used as the material of the three-layered food.

The various objects and advantages of the present invention will be more readily understood from the following detailed description when read in conjunction with the appended drawing.

DETAILED DESCRIPTION OF THE PREFERRED EMBODIMENTS

Referring to FIGS. 1, 2, 6, and 7, the present invention includes the following device.

At least two first guide units 10 are longitudinally arranged. Each guide unit 10 is a tapered cylinder. An interior of each first guide unit 10 has a first screw propeller 11 having blades 111. Dough A enters into the guide unit 10 from the upper end of each first guide unit 10 and then is transferred for further processing.

Figure 2:
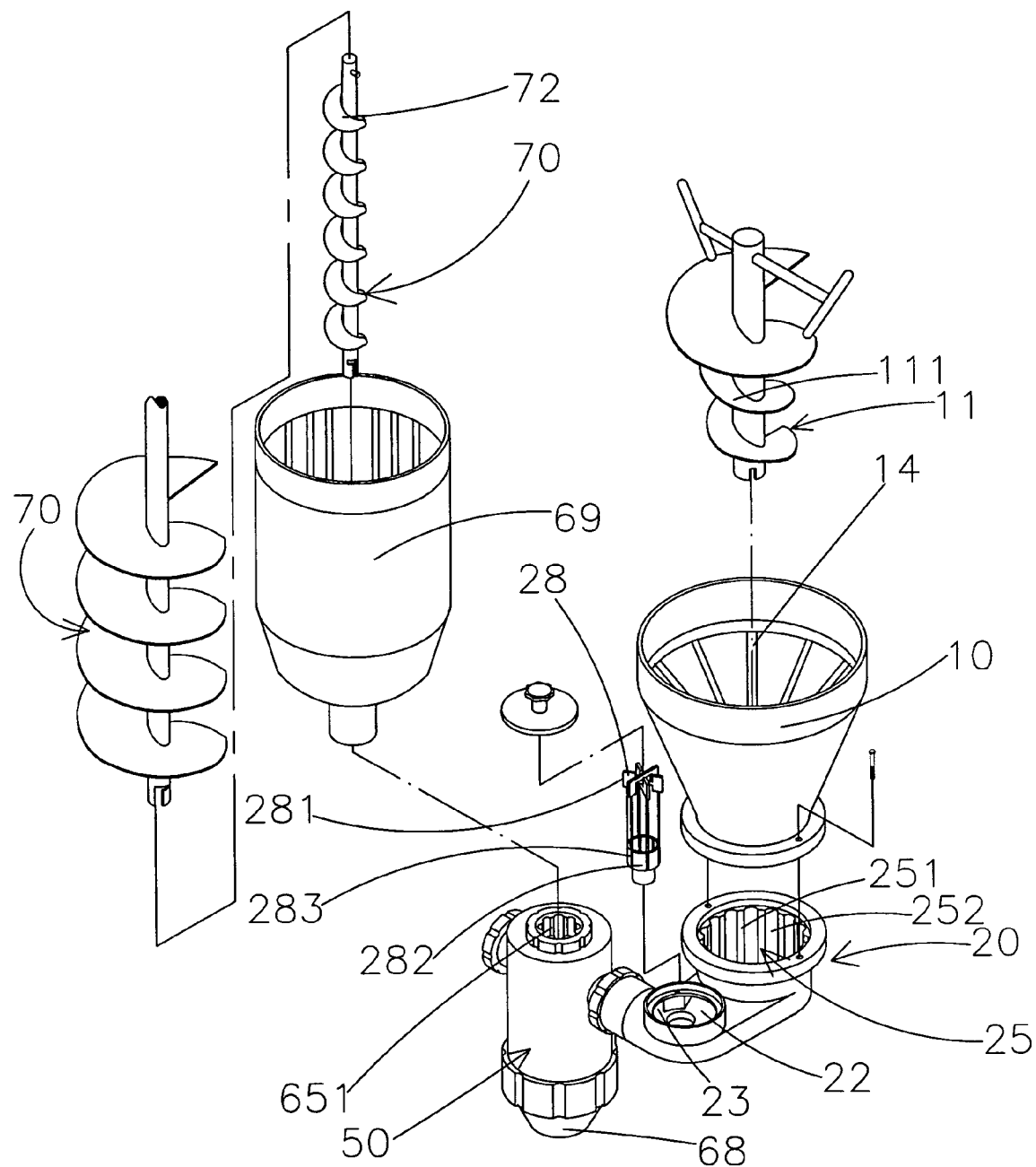
FIG. 2 is an exploded perspective view of the guide units and guide device of the present invention.
Figure 3:
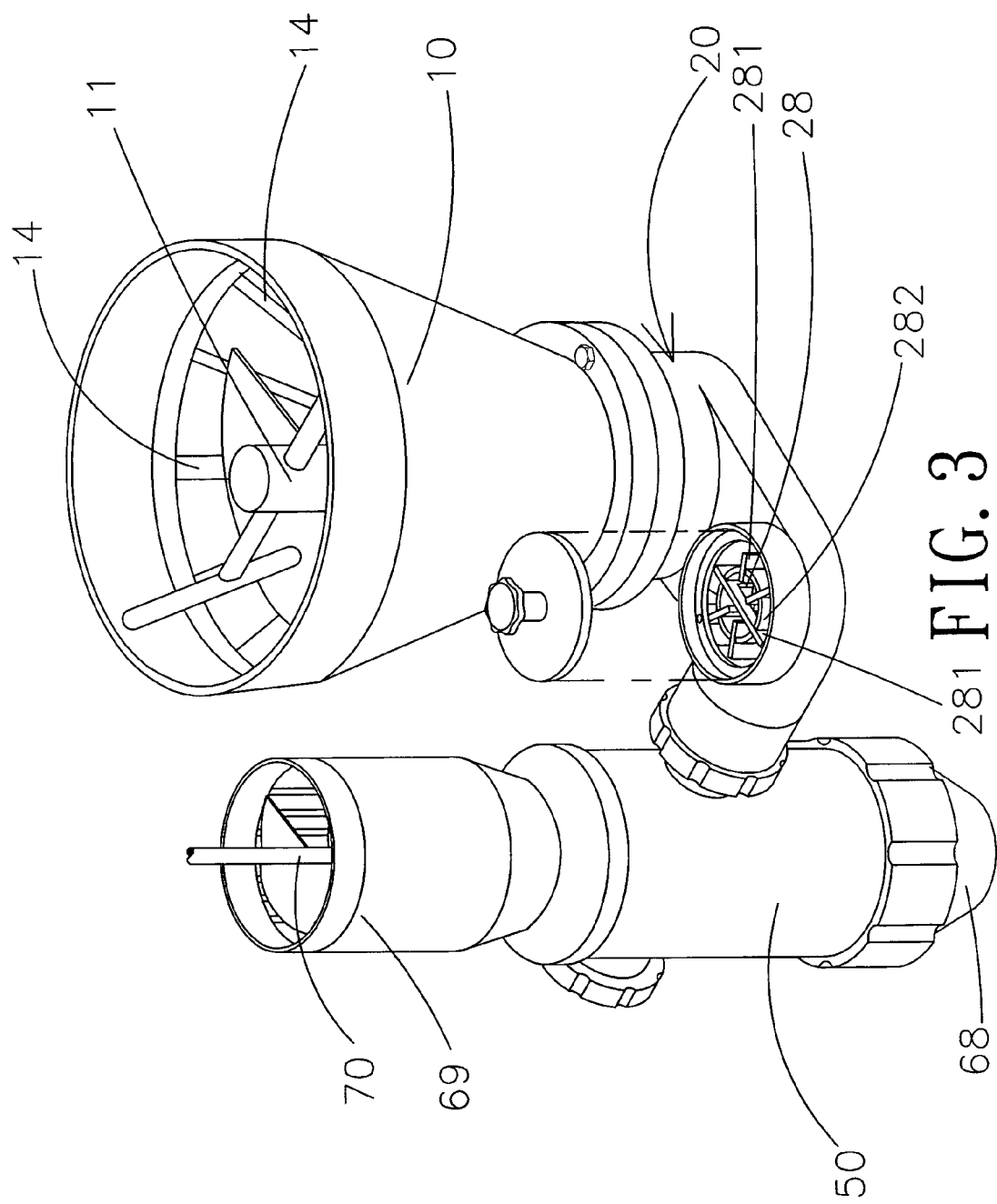
FIG. 3 is an assembled perspective view showing the guide units and guide device of the present invention.
Figure 5:
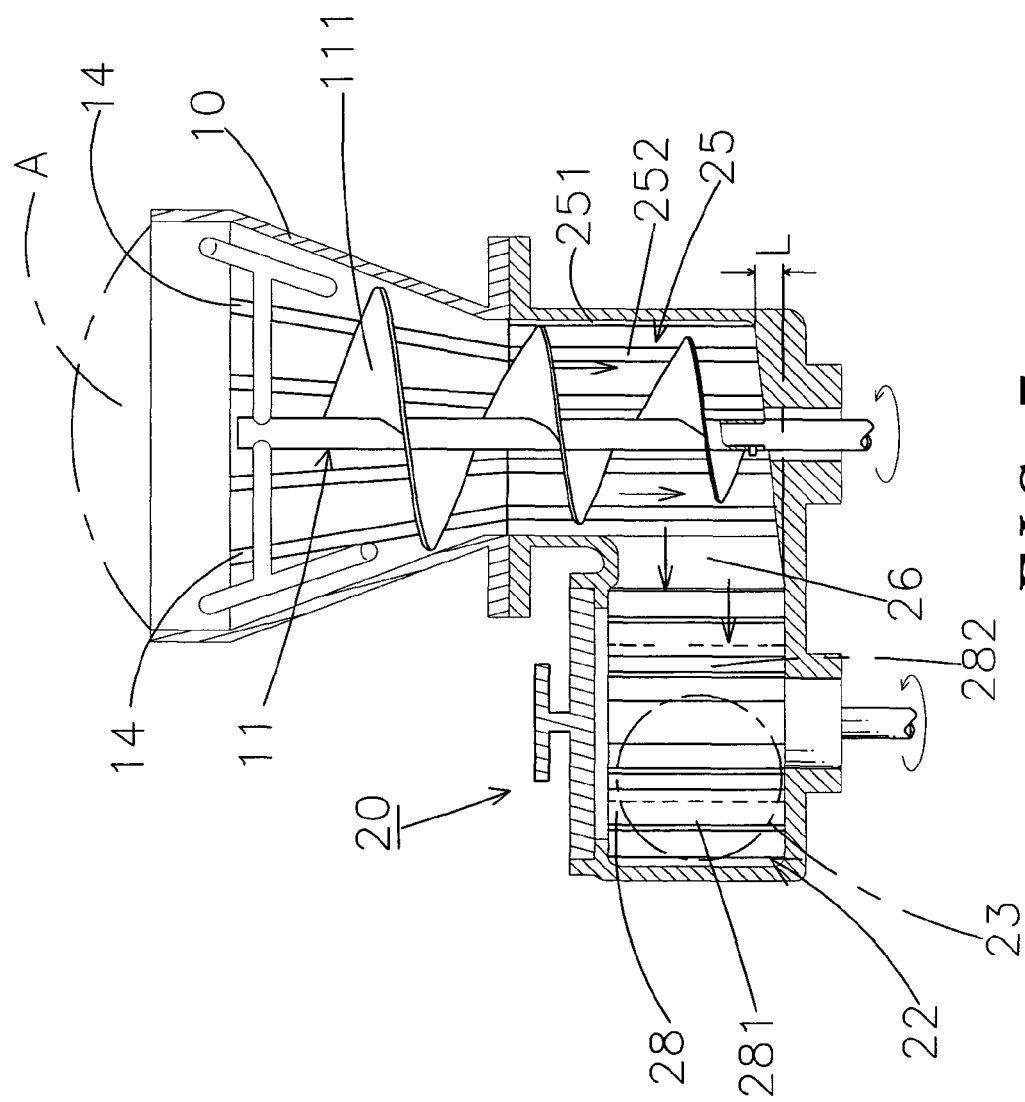
FIG. 5 is a schematic cross section view showing the receiving tanks of the guide device of the present invention.
Figure 6:
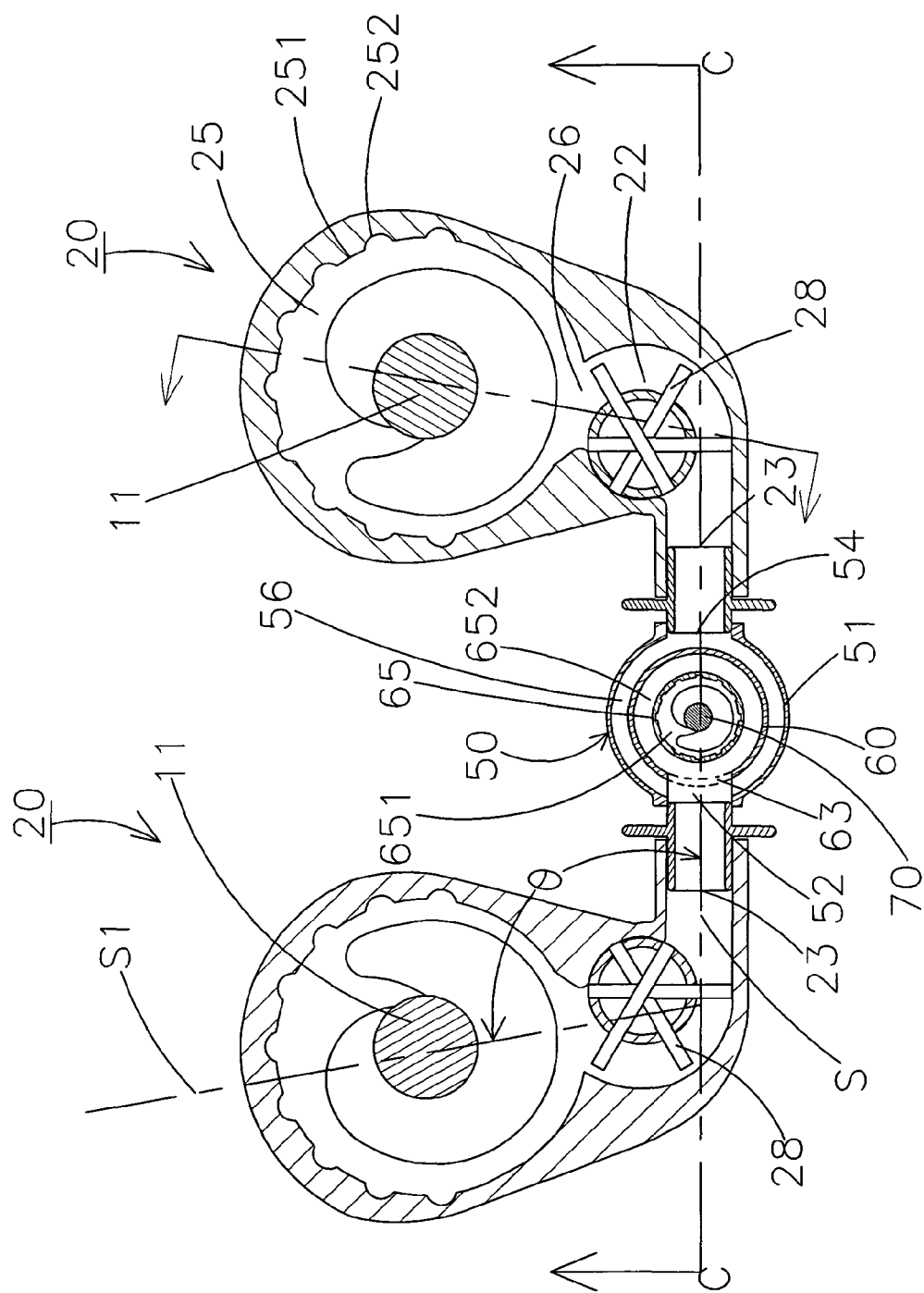
FIG. 6 is a schematic cross section view of the present invention.
Figure 7:
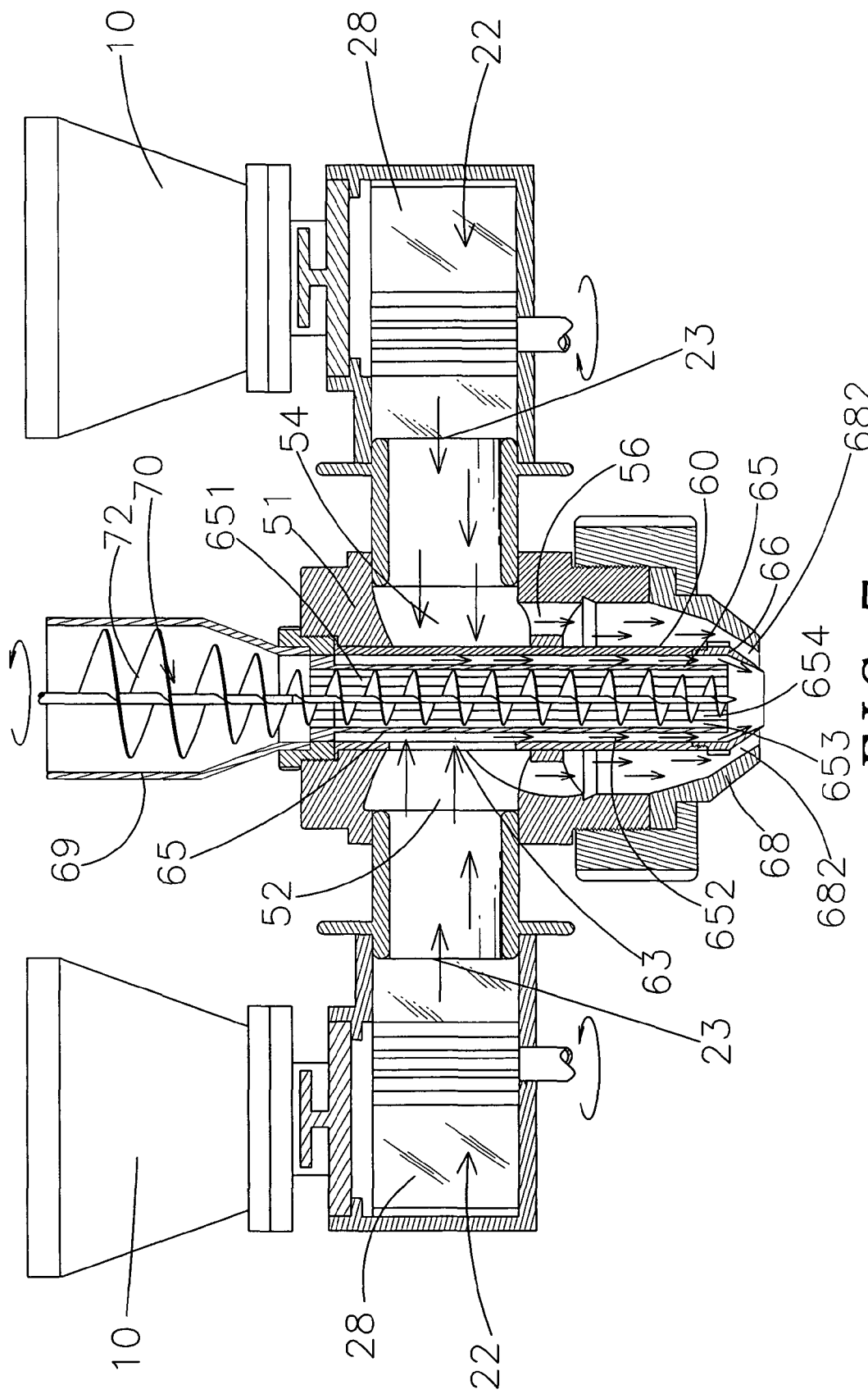
FIG. 7 is a schematic cross section view along line C-C of FIG. 6.

At least two guide devices 20 are horizontally arranged. Each guide device 20 is below and connected to a respective one of the two first guide units 10, as shown in FIGS. 2, 3, and 5. Each guide device 20 includes the following elements. A longitudinal first receiving tank 22. An inner wall of the first receiving tank 22 is formed with a path 23.

Another longitudinal second receiving tank 25 is arranged adjacent to the first receiving tank 22. A wall of the second receiving tank 25 is installed with convex strip 251 and concave portion 252. A guide hole 26 serves to communicate the first receiving tank 22 and the second receiving tank 25. An upper opening of the second receiving tank 25 is communicated to the first guide unit 10. A dough A is guided by the screw propeller 11 to the second receiving tank 25 and then through the guide hole 26 to the first receiving tank 22 (referring to FIG. 9).

A turbine pump 28 is horizontally arranged to the first receiving tank 22 so as to form a propeller for changing direction of the dough A in the first receiving tank 22 so that the dough A in the guide hole 26 is fed into the path 23 continuously.

Figure 4:
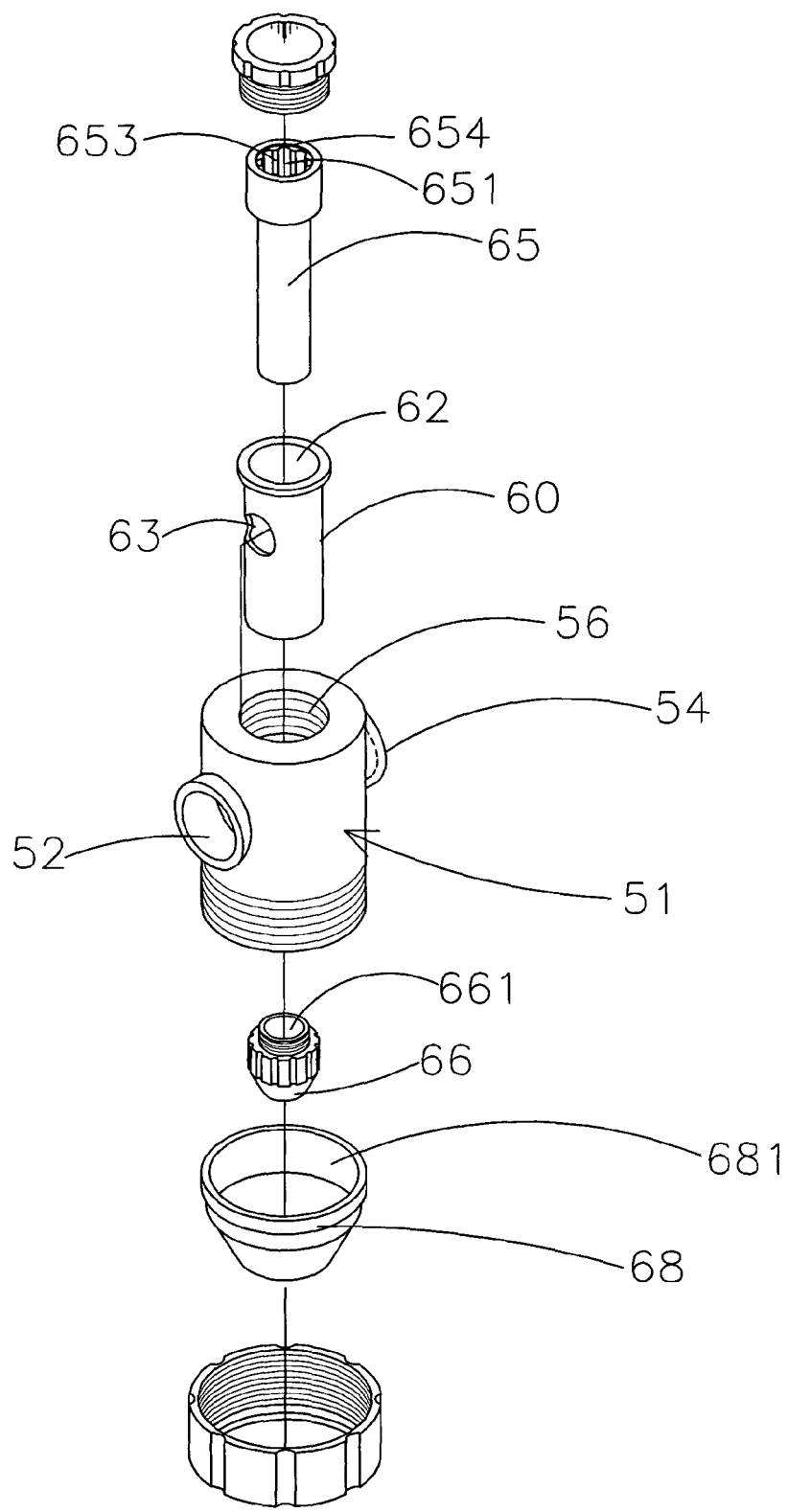
FIG. 4 is an exploded view of the output device for output the cylindrical food according to the present invention.

A food output unit 50 (referring to FIG. 4) with a cylindrical food 90 includes the following elements (referring to FIG. 4).

A main tube 51 has a left inlet 52 and a right inlet 54 and a longitudinal through hole 56.

A middle tube 60 has a longitudinal through hole 62 and a lateral inlet 63. The middle tube 60 is engaged to the longitudinal through hole 56 of the main tube 51.

An inner tube 65 has a longitudinal through hole 651 and is engaged to the longitudinal through hole 62 of the middle tube 60.

An inner circular path 652 is formed between the inner tube 65 and the middle tube 60; a cylindrical second guide unit 69 is connected to an upper opening of the inner tube 65; an inner wall of the inner tube 65 is installed with convex strips 653 and concave portions 654.

An inner material guiding nozzle 66 has a longitudinal inner material guiding holes 661. The inner material guiding nozzle 66 is firmly secured to a lower opening of the middle tube 60.

An outer material guiding nozzle 68 has a longitudinal outer material guiding hole 681 firmly secured to a lower opening of the longitudinal path 56 of the main tube 51. An outer circular path 682 is formed between the inner material guiding nozzle 66 and the outer material guiding nozzle 68.

The second screw propeller 70 having blades 72 is pivotally connected to the second guide unit 69 and the longitudinal path 651 of the inner tube 65. The stuffing B is filled into the second guide unit 69. Then the stuffing B is pushed to the output end of the inner tube 65 by the second screw propeller 70 so as to be as an inner layer material 91 of the cylindrical food 90 (referring to FIG. 8).

In the present invention, the dough A is fed into the left and right inlets 52, 54 of the main tube 51 from the two paths 23, respectively. The dough A from one of the first two oaths 23 will collide horizontally to the wall of the middle tube 60. Thus the moving direction of the dough A is changed to a longitudinal direction so that the dough A moves longitudinally in the longitudinal path 56, of the main tube 51. Then the dough A passes through the outer circular path 682 to be outputted so as to be as an outer layer material 92 of the food product of the cylindrical food 90.

The dough A from the other of the two first paths 23 horizontally passes through the lateral inlet 63 of the middle tube 60 and collides an outer wall of the inner tube 65. Then the dough A is guided by the inner circular path 652 and outputted so as to be as a middle layer material 93 of the cylindrical food 90. Thus the three layers of the cylindrical food 90 are formed.

Figure 12:
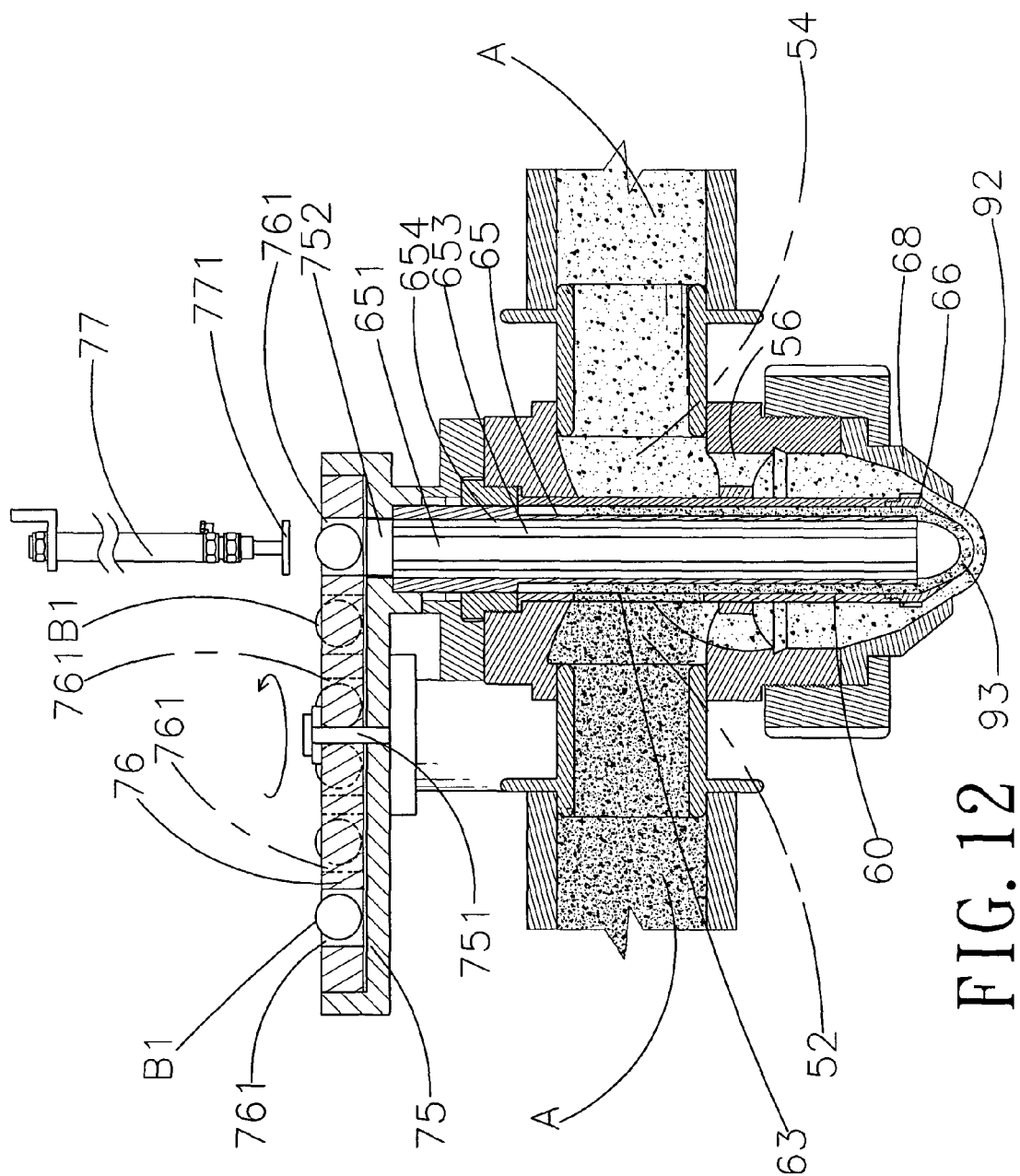
FIG. 12 is a cross section view of the embodiment of the present invention where the stuffing being filled to the guide units are particle stuffing.
Figure 13:
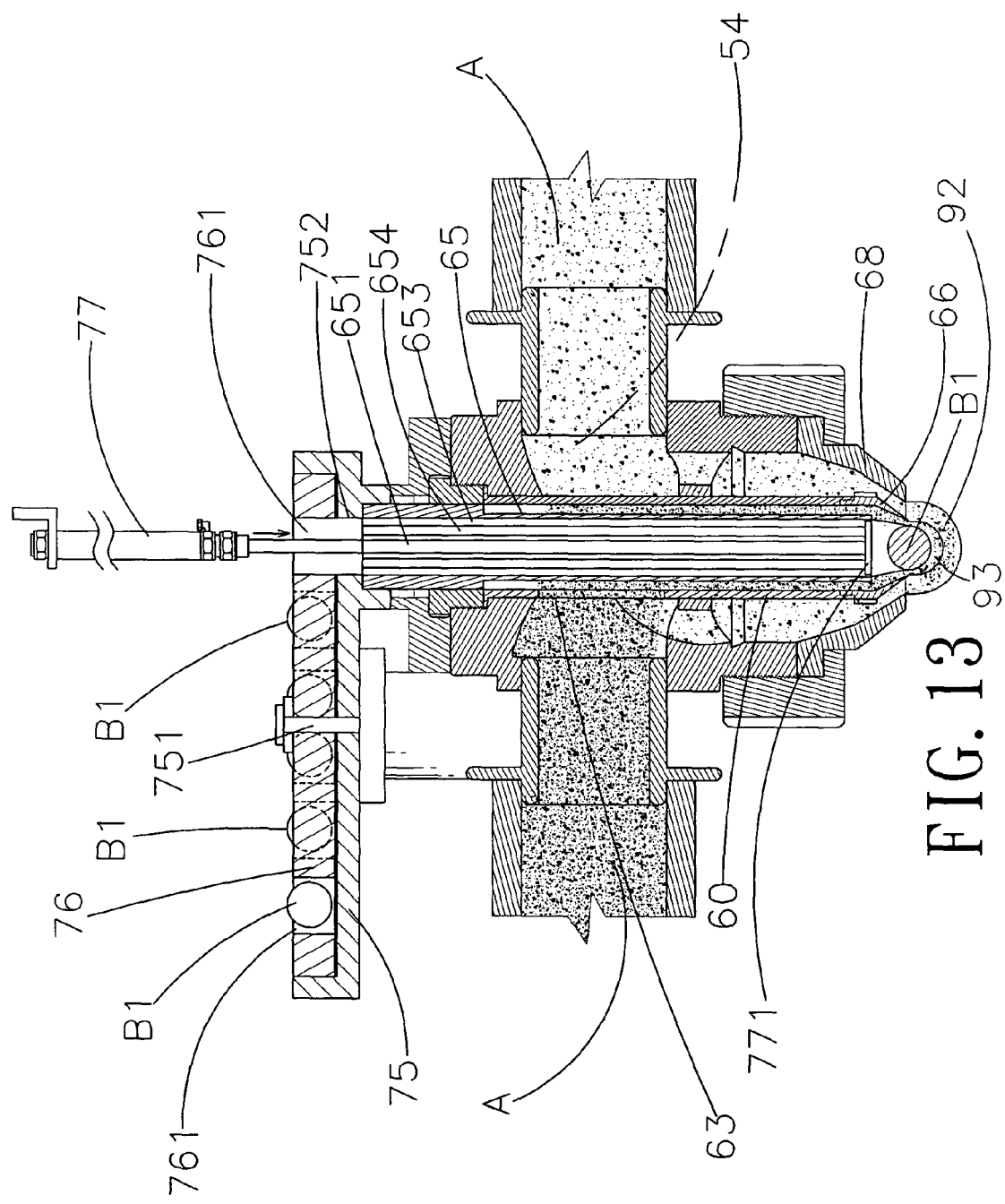
FIG. 13 is another cross section view of the embodiment of the present invention where the stuffing being filled to the guide units are particle stuffing.

Referring to FIGS. 12 and 13, in above said device, the inner wall of the inner tube 65 is formed with a plurality of convex strips 653 and a plurality of concave portions 654.

A disk seat 75 is a rotary shaft 751 at a center thereof. The disk seat 75 is installed above the inner tube 65. A guide hole 752 is installed on the disk seat 75. The guide hole 752 is communicated to the longitudinal path 651 of the inner tube 65.

A rotary disk 76 with a plurality of material guide holes 761 therein is passed by the rotary shaft 751. When the rotary disk 76 rotates, one of the material guide holes 761 will align to the guide hole 752 of the disk seat 75.

An air pressure cylinder 77 is installed above the material guide hole 761. The piston 771 of the air pressure cylinder 77 enters into the longitudinal path 651 from the material guide hole 761 and the guide hole 752 so as to displace between an upper extreme point and a lower extreme point.

From above mentioned feature, a cut device 80 is installed below the output unit 50. The cylindrical food 90 enters into a central hole 82 of the cut device 80. The cut device 80 has a plurality of knifes 84 which can seal the central hole 82 so as to cut of the cylindrical food 90 SO as to form a plurality of ball-like foods 95. The ball-like foods 95 will fall to a transfer belt 98 for being outputted. The ball-like food 95 has an inner layer material 91, a middle layer material 93, and an outer layer material 92.

From above said features, the inner walls of the two guide units 10 are installed with a plurality of line shape concave portions 14 so as to drive the dough A to move downwards in the two guide units 10 so that the dough A moves smoothly.

From above mentioned features, the bottoms of the second receiving tank 25 and first receiving tank 22 have a stepped difference L so that the dough A in the second receiving tank 25 can be transferred to the first receiving tank 22 rapidly.

In the present invention, the stuffing B can be powdered stuffing or particle stuffing B1.

An angle Θ between a extension line S along the path 23 and an extension line S1 of the second receiving tank 25 is between 90 to 130 degrees.

Figure 1:
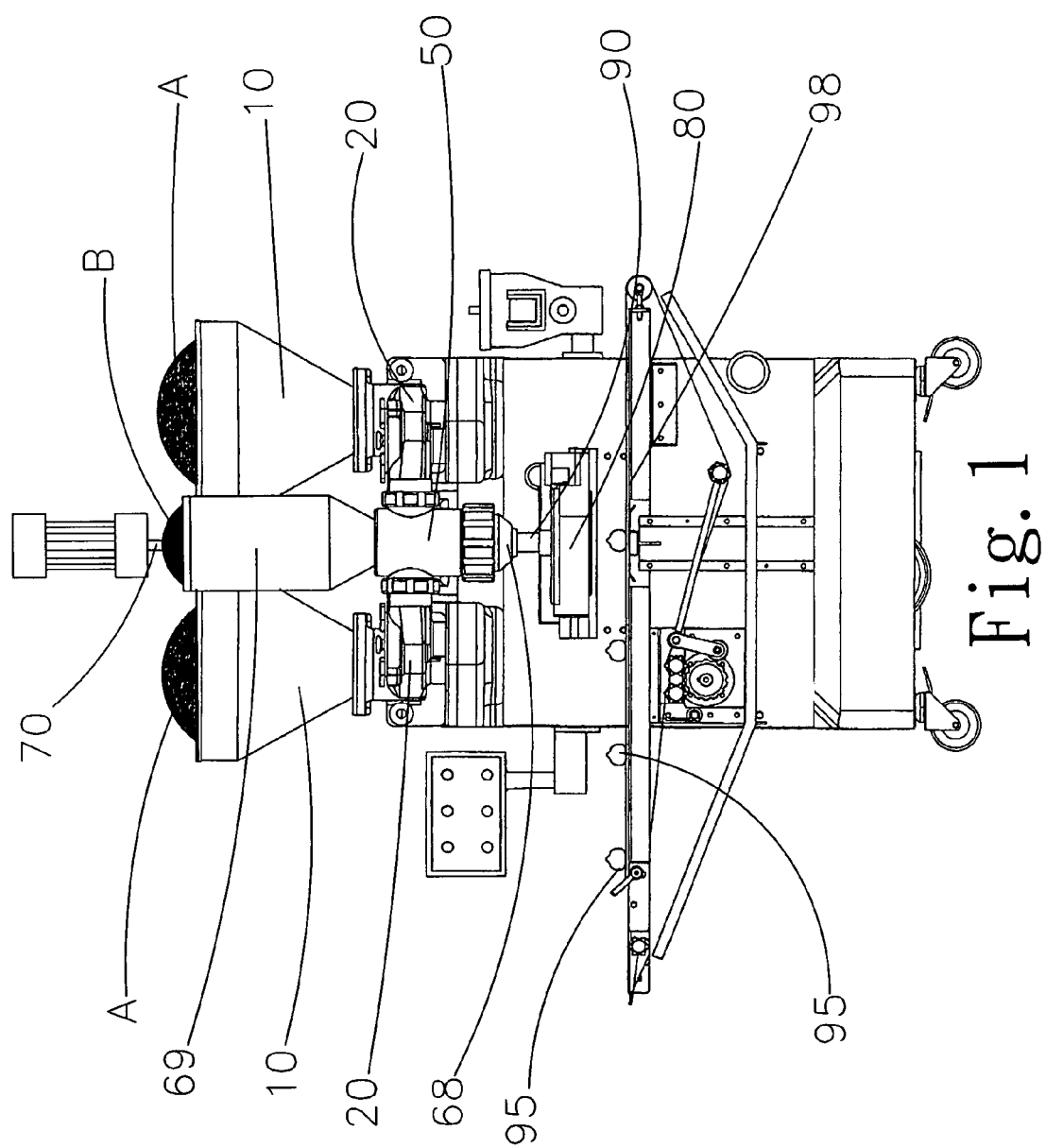
FIG. 1 is a front plane view of the present invention.

Referring to FIGS. 1 and 3, the flexible and flowable dough A is placed in the two guide units 10. The soft stuffing B is placed in the guide unit 69. The screw propellers 11, 70 rotates so that the dough A in the two guide units 10 moves downwards. The dough A enters into the second receiving tank 25 (referring to FIG. 9). By design of the concave portions 14, 252 and the convex strips 251, the movement of the dough A is guided from the guide units 10 to the second receiving tank 25 so that the turbulent flows in the guide units 100 and the second receiving tank 25 are reduced to minimum.

Figure 8:
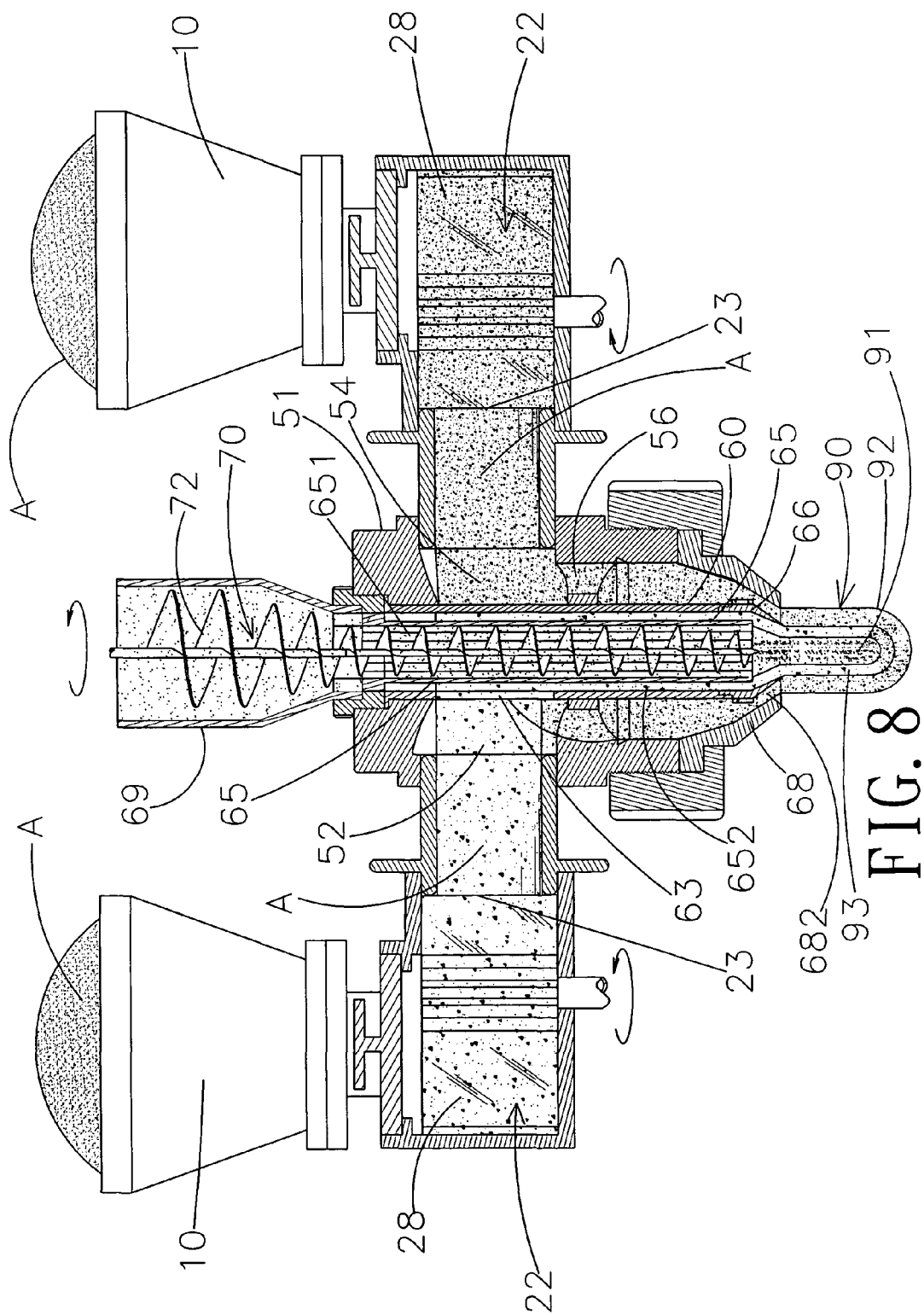
FIG. 8 is a schematic view showing the operation of the embodiment illustrated in FIG. 7.

With reference to FIGS. 2 and 3, two turbine pumps 28 are formed by a plurality of blades 281 which are movably connected to the insertion slots 283 of the rotary bush 282. The bush 282 can drive the blades 281 to rotate in the first receiving tank 22 with a position shift from the center so that the moving dough A in the second receiving tank 25 is further fed in a specific direction onctinuously. Then the dough A passes through the paths 23 to the main tube 51 from the inlets 52 and 54, as shown in FIG. 5. The bottoms of the first and second receiving tanks 22, 25 have an elevation difference L so that the dough A in the second receiving tank 25 can move toward the first receiving tank 22. Referring to FIG. 8, the dough A into the right inlet 54 of the main tube 51 is extruded by the outer wall of the middle tube 60. Then the dough A moves to the outer circular path 682 along the longitudinal path 56 and is outputted from the lower outlet of the main tube 51 so as to be formed as the outer layer material 92 of the cylindrical food 90. The part of the dough A enters into the left inlet 52 moving in the outer circular path 682 along the longitudinal path 56 will mix with the part of the dough A inputted from the right inlet 54. Another part of the dough A enters into the transversal inlet 63, moves downwards along the inner circular path 652 and then is guided out from the lower outlet of the main tube 51 so as to be formed as a middle layer material 93 of the cylindrical food 90. Furthermore, in the present invention the longitudinal path 56 can be isolated from the transversal inlet 63.

The stuffing B is in the second guide unit 69 and screwedly moves forward by the screw propeller 70. The stuffing B moves downwards along the longitudinal path 651. By the convex strips 653 and the concave portions 654, the stuffing B will move along the longitudinal path 651 downwards.

When the stuffing B is guided out from the lower end of the inner tube 65, it will form as an inner layer material 91 of the cylindrical food 90. Then the inner layer material 91, middle layer material 93, and outer layer material 92 are formed by above mentioned process.

Figure 9:
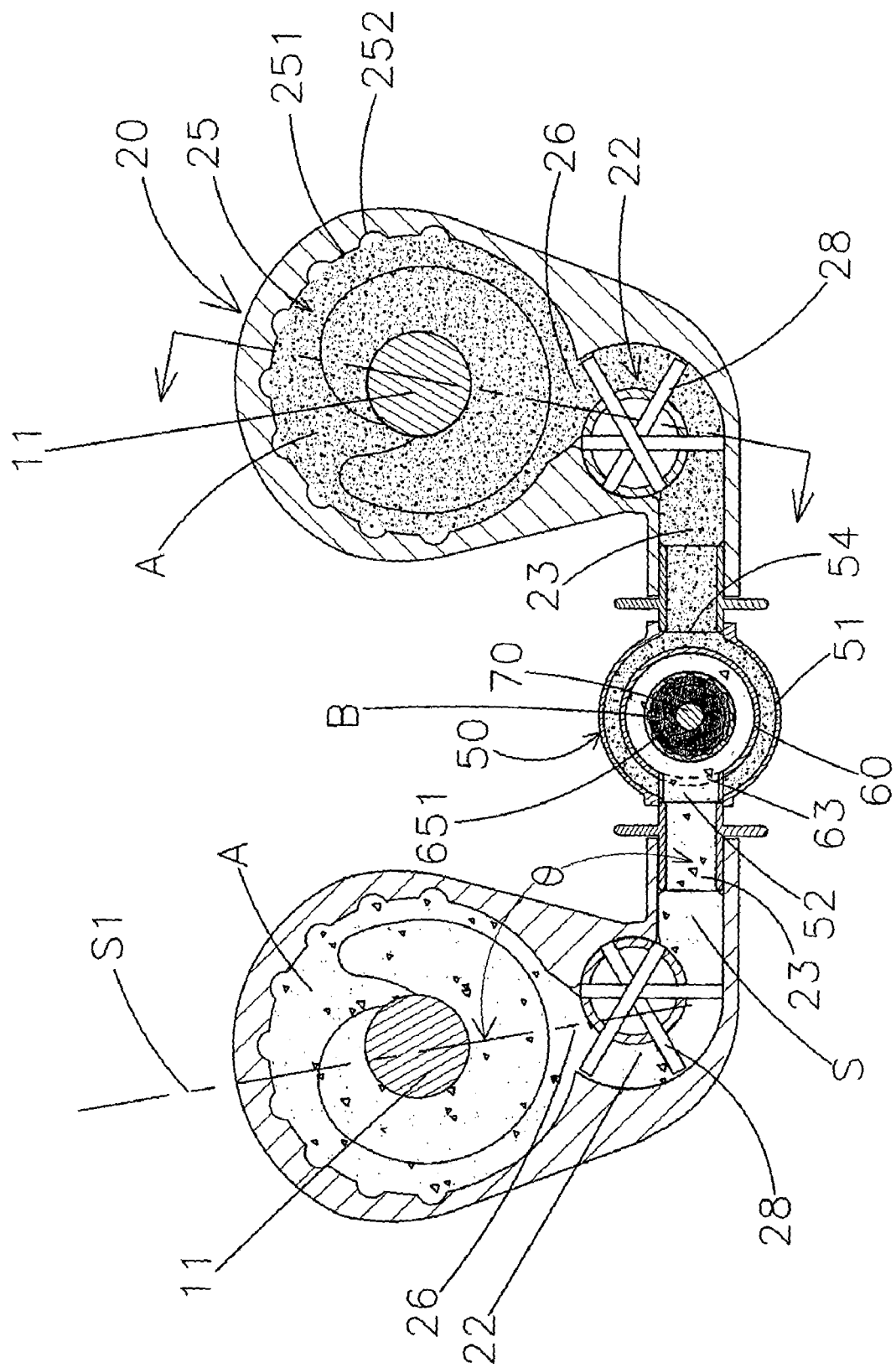
FIG. 9 is a schematic view showing the operation of the embodiment illustrated in FIG. 6.

With reference to FIGS. 8, and 9, the stuffing B of the present invention is not confined to be soft material (containing water). Powdered stuffing B is allowable in the present invention. The dry powdered stuffing B (such as peanut powders) in the guide unit 69 is pushed by the screw propeller 70 so that the stuffing B will move downwards. Then by the linear convex strips 653 and the concave portions 654, the dry powdered stuffing B moves downwards along the longitudinal path 651. Finally, the stuffing B is formed as ahte inner layer material 91 of the cylindrical food 90. The guide of the stuffing B is stable and reliable.

Figure 14:
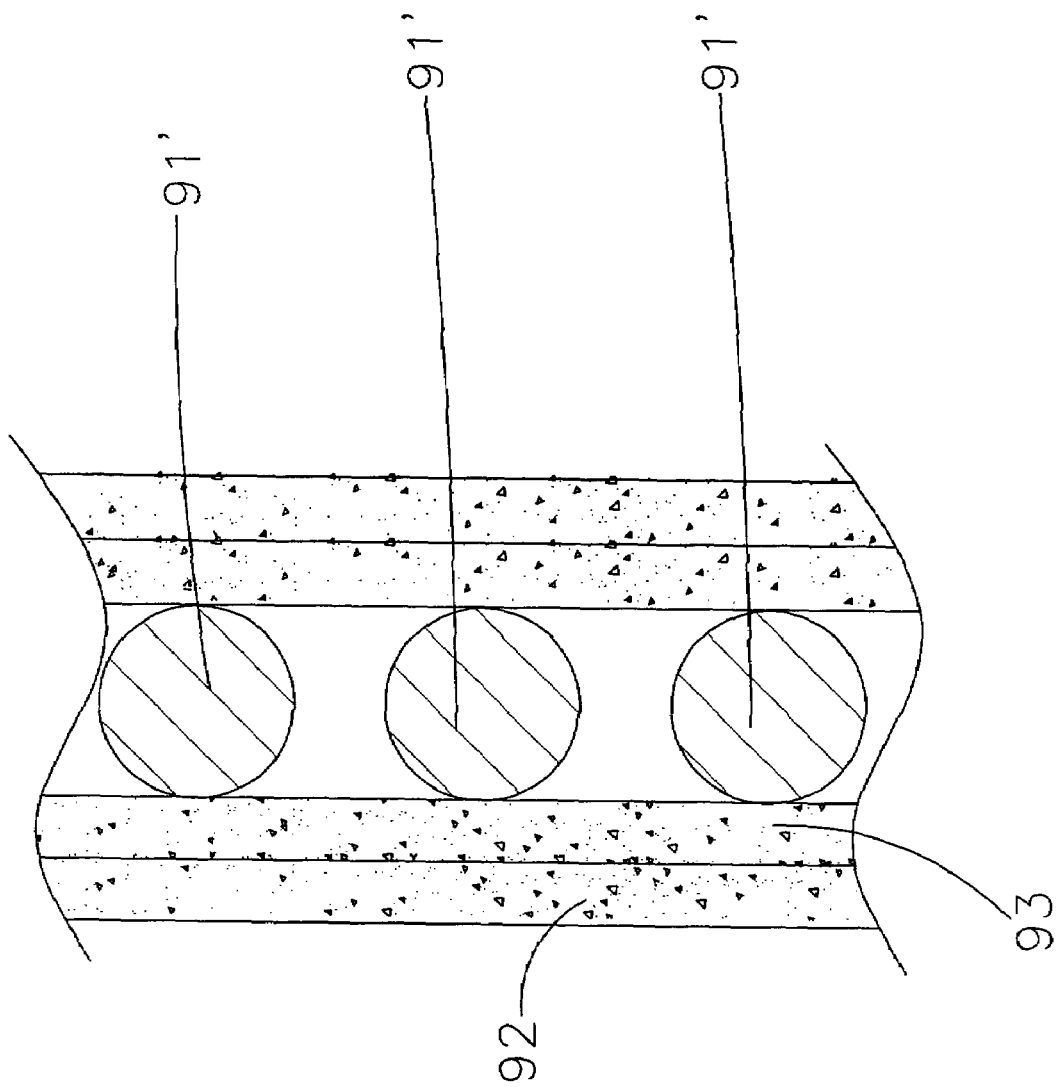
FIG. 14 is cross section view showing the cylindrical food of the present invention.
Figure 15:
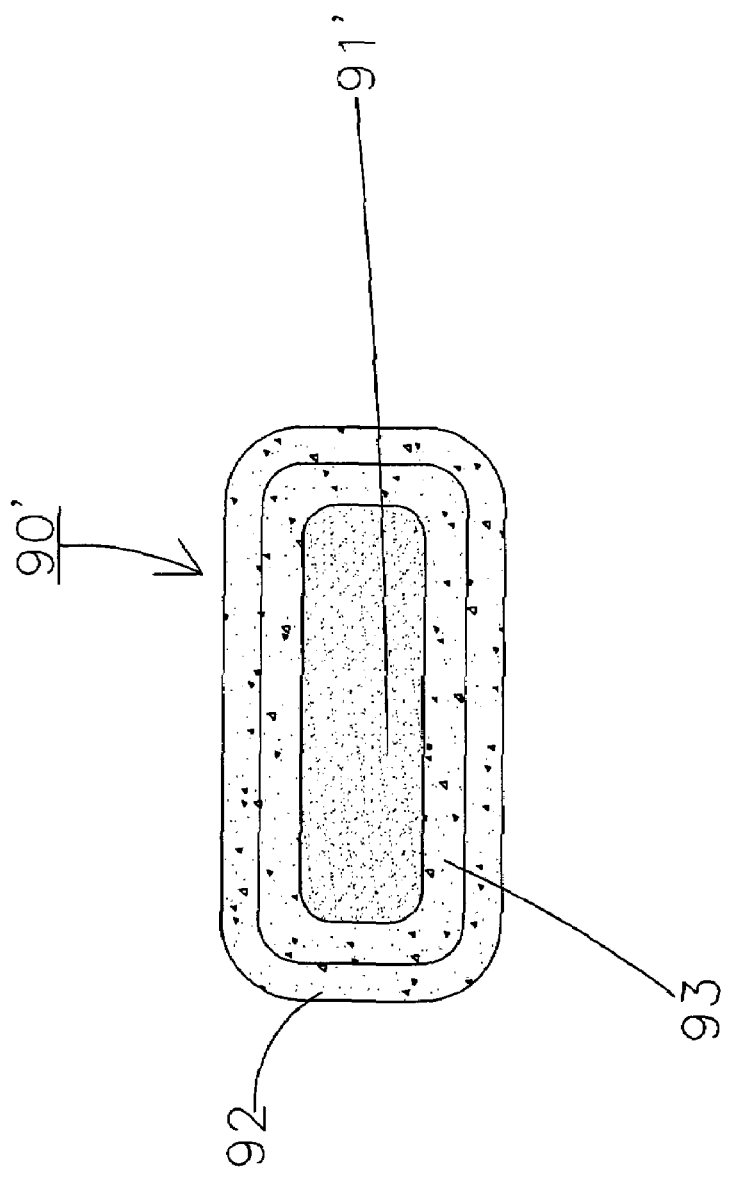
FIG. 15 is a cross section view showing that the cylindrical food is cut as pies according to the present invention.

Referring to FIG. 12, it is illustrated that the stuffing B is particle stuffing B. At this example, rotary shaft 751 drives the round rotary disk 76 to rotate on the fixed disk seat 75 through a length. Then the particle stuffing B are filled into the plurality of material guide holes 761. When the material guide holes 761 are aligned to the guide holes 752, the round rotary disk 76 will stop to rotate temporarily, as shown in FIG. 13. Then the air pressure cylinder 77 actuates so that the piston 771 moves from the upper extreme to the lower extreme. Thus the particle stuffing B (which can be particles of yolk or fruits) is pressed downwards to the distal end of the longitudinal path 651 so that the particle stuffing B will be formed as the inner layer material 91' of the cylindrical food 90, as shown in FIG. 14. When the piston 771 restores to the upper extreme, the rotary disk 76 will rotate through a length so that the piston 771 can move to the lower extreme again for filling stuffing B again. At this case, the concave portions 654 serve for causing the air in the inner tube 65 can be guided out along the concave portions 654 as the piston 771 moves longitudinally. Thereby, the piston 771 can move smoothly. Thus the inner layer material 91' of the cylindrical food 90 is distributed discontinuously. Then the cylindrical food 90 is cut by the cut device 80. The pie food 90' or other foods with particle (solid) inner layer material 91' can be made (referring to FIG. 15).

Figure 10:
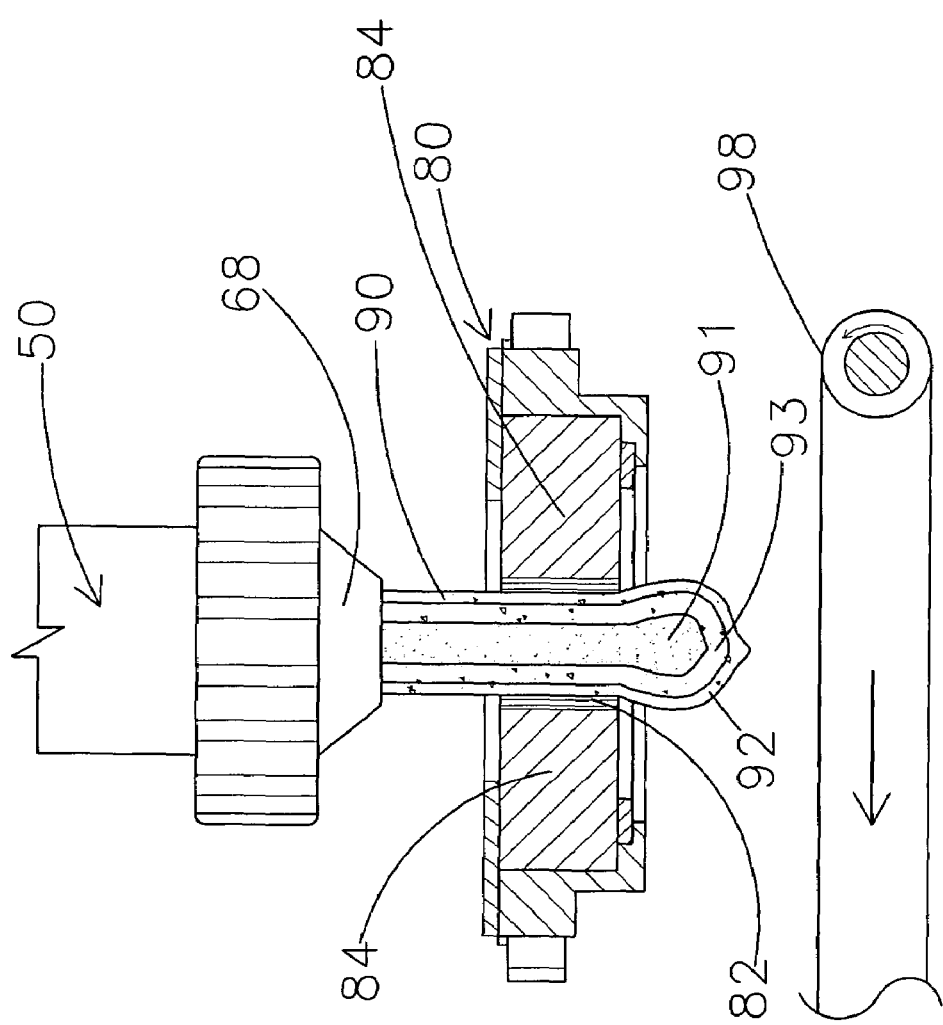
FIG. 10 is a schematic cross section view showing that the cylindrical food passes through the central opening of a cut device according to the present invention.
Figure 11:
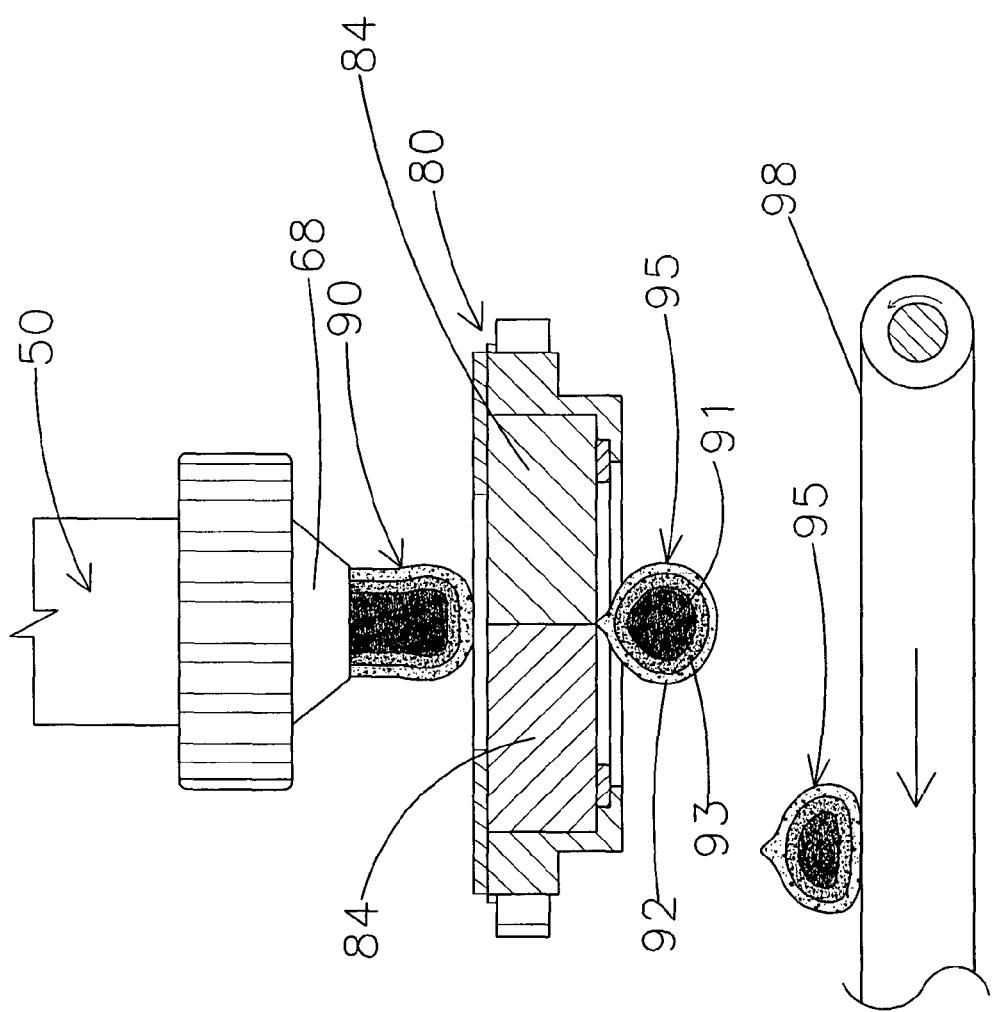
FIG. 11 is a cross section view showing that the cylindrical food is cut into ball-like foods by the cut device according to the present invention.

With reference to FIG. 10, the cut device 80 is installed exactly under the output unit 50. The cylindrical food 90 outputted from the output unit 50 passing through the central hole 82 of the cut device 80, as shown in FIG. 11. The plurality of knifes 84 in the cut device 80 will seal the central hole 82 so as to cut the cylindrical food 90 to be as ball-like foods 95 which then falls to the transfer belt 89 to be sent out. The ball-like food 95 has three layers.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A food shaping device for forming a three-layered food comprising:

at least two first guide units which are longitudinally arranged; each guide unit being a tapered cylinder; an interior of each first guide unit having a first screw propeller having blades; a dough entering into the guide unit from an upper end of each first guide unit and then being transferred for being further processed;

at least two guide devices being horizontally arranged; each guide device being below and connected to a respective one of the two first guide units; each guide device including:

a longitudinal first receiving tank; an inner wall of the first receiving tank being formed with a first path; another longitudinal second receiving tank being arranged adjacent to the receiving tank; a wall of the second receiving tank being installed with convex strips and concave portions; a guide hole serving to communicate the first receiving tank and the second receiving tank; an upper opening of the second receiving tank being communicated to the first guide unit; a dough being guided by the screw propeller to the second receiving tank and then through the guide hole to the first receiving tank;

a turbine pump being horizontally arranged to the first receiving tank so as to form a propeller for changing direction of the dough in the first receiving tank so that the dough in the guide hole is fed into the first path; a food output unit for outputting a cylindrical food including:

a main tube having a left inlet, a right inlet and a longitudinal through hole;

a middle tube having a longitudinal through hole and an lateral inlet; the middle tube being engaged to the longitudinal through hole of the main tube;

an inner tube having a longitudinal through hole and being engaged to the longitudinal through hole of the middle tube;

an inner circular path being formed between the inner tube and the middle tube; a cylindrical second guide unit being connected to an upper opening of the inner tube; an inner wall of the inner tube being installed with convex strips and concave portions;

an inner material guiding nozzle having longitudinal inner material guiding holes; the inner material guiding nozzle being firmly secured to a lower opening of the middle tube;

an outer material guiding nozzle with a longitudinal outer material guiding hole firmly secured to a lower opening of the longitudinal path of the main tube; an outer circular path being formed between the inner material guiding nozzle and the outer material guiding nozzle;

wherein a second screw propeller has blades; the second screw propeller is pivotally connected to the second guide unit and the longitudinal path of the inner tube; a stuffing is filled into the second guide unit; then the stuffing is pushed to the output end of the inner tube by the second screw propeller to be as an inner layer material of the cylindrical food;

wherein the dough is fed into the left and right inlets of the main tube from the two first paths, respectively; the dough from one of the two first paths will collide horizontally to the wall of the middle tube; thus the moving direction of the dough is changed to a longitudinal direction so that the dough moves longitudinally in the longitudinal path of the main tube; then the dough passes through the outer circular path to be outputted as an outer layer material;

wherein the dough from the other of the two first paths horizontally passes through the lateral inlet of the middle tube and collides an outer wall of the inner tube; then the dough is guided by the inner circular path and outputted as a middle layer material; thus a three layer cylindrical food is formed.

2. The food shaping device for forming a three-layered food as claimed in claim 1, further comprising:

a disk seat having a rotary shaft at a center thereof; the disk seat being installed above the inner tube; a guide hole being installed on the disk seat; the guide hole being communicated to the longitudinal path of the inner tube;

a rotary disk with a plurality of material guide holes therein being passed by the rotary shaft; wherein when the rotary disk rotates, one of the material guide holes will align to the guide hole of the disk seat; and an air pressure cylinder being installed above the material guide hole; a piston of the air pressure cylinder entering into the longitudinal path from the material guide hole and the guide hole so as to move between an upper extreme point and a lower extreme point.

3. The food shaping device for forming a three-layered food as claimed in claim 1, further comprising:

a cut device being installed below the output unit; the cylindrical food entering into a central hole of the cut device; the cut device having a plurality of knifes which can seal the central hole so as to cut of the cylindrical food to form a plurality of ball-like foods; the ball-like foods fall to a transfer belt for being outputted; each ball-like food has the inner layer material, the middle layer material, and the outer layer material.

4. The food shaping device for forming a three-layered food as claimed in claim 1, wherein inner walls of the two first guide units are installed with a plurality of line shape concave portions so as to drive the dough to move downwards in the two guide units so that the dough moves smoothly.

5. The food shaping device for forming a three-layered food as claimed in claim 1, wherein bottoms of the second receiving tank and first receiving tank have a stepped difference so that the dough in the second receiving tank is transferred to the first receiving tank rapidly.

6. The food shaping device for forming a three-layered food as claimed in claim 1, wherein an angle between the first path and the second receiving tank is between 90 to 130 degrees.

* * * * *